April 3, 1951  C. C. DE WITT  2,547,568
OFFSET TILLER OPERATED BY TRACTOR POWER TAKE-OFF
Filed Sept. 19, 1946  2 Sheets-Sheet 1

INVENTOR
C.C. DE WITT
ATTORNEY

April 3, 1951  C. C. DE WITT  2,547,568
OFFSET TILLER OPERATED BY TRACTOR POWER TAKE-OFF
Filed Sept. 19, 1946  2 Sheets-Sheet 2

INVENTOR
C.C. DEWITT
Chas. Krassork
ATTORNEY

Patented Apr. 3, 1951

2,547,568

UNITED STATES PATENT OFFICE 2,547,568

OFFSET TILLER OPERATED BY TRACTOR POWER TAKE-OFF

Charles Clifford DeWitt, Fruitland P. O., Ontario, Canada

Application September 19, 1946, Serial No. 697,843
In Canada September 22, 1945

1 Claim. (Cl. 97—137)

My invention relates in general to farm implement attachments for tractors for the purpose of cultivating the soil, and it particularly relates to such implements which are used for tilling or hoeing of soil between rows of trees such as may be found on fruit farms.

In the tilling of soil where a number of trees are planted in the usual row formation, considerable difficulty is encountered in the use of tilling or hoeing attachments such as are used in conjunction with tractors. This is due to the fact that mechanical tillers cannot be used on the strip of land directly in line with the rows of trees because of such tiller encountering each tree in the row and having to be lifted out of the ground and pulled out of the way of the tree and then replaced again into the ground after the tree has been passed. Considering the number of trees usually found on fruit farms, such procedure would, from a practical point of view, be next to impossible. Consequently, the practice up to now has been to cultivate the soil adjacent to the rows of trees by means of horse or tractor drawn tillers, and then cultivate the strip in line with the trees by hand. Needless to say, this procedure involves a considerable loss of time and labor.

Such difficulty is met with on a considerable scale in the cultivation of ground on which are planted grape vines. It has been the practice so far, to have some form of cultivator drawn by horses, while the operator pushes the implement in and out of the grape vines. In view of the digging nature of such implement, this work involves many hardships.

It is therefore the object of this invention to provide a tilling or hoeing attachment for a tractor which is to be used for the purpose of cultivating soil upon which are planted rows of trees in the usual manner, or upon which are planted grape vines.

Another object of the invention is to provide a tiller such as mentioned above, in which the tilling action is continuous.

And a further object of the invention is to provide an attachment such as mentioned above in which the actual cutting or digging tools are interchangeable.

The above objects are accomplished by the design and construction of the above-mentioned invention in which means are provided for the rapid offsetting of the tiller arm, mechanically, as it encounters a tree or grape vine.

In describing the invention reference will be made to the attached drawings in which.

Figure 1:
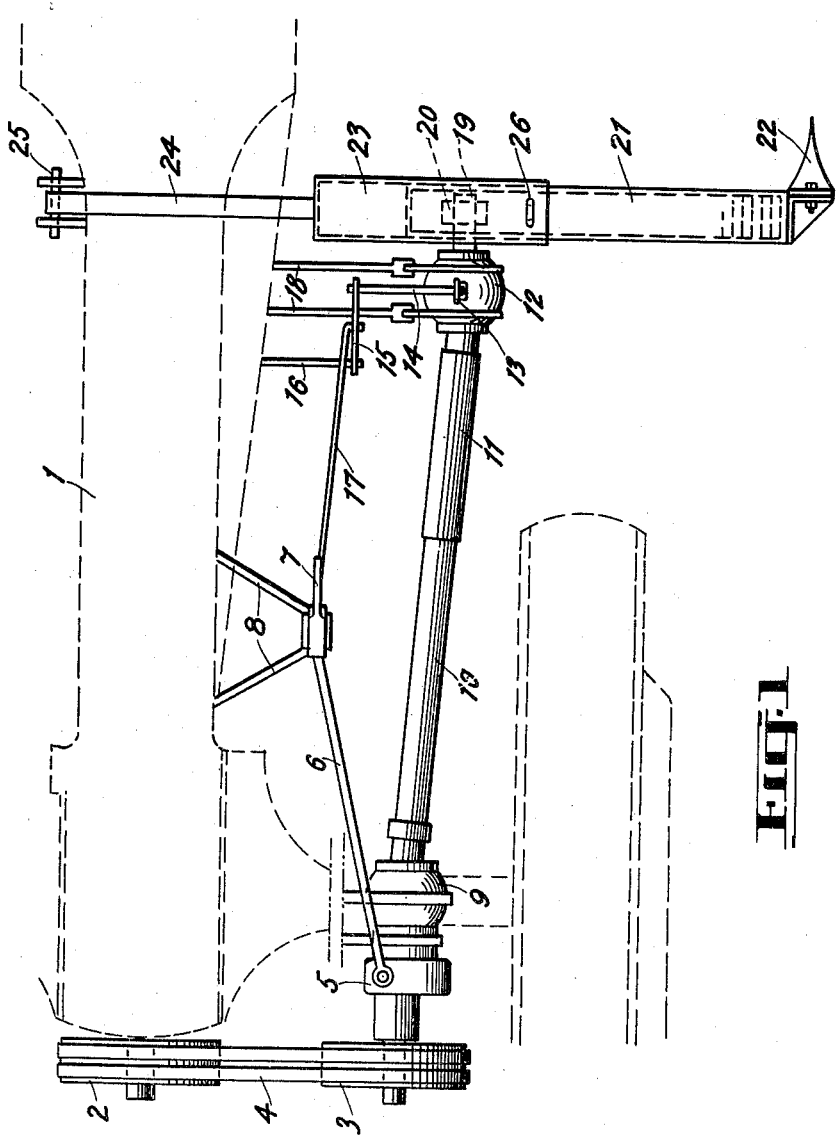
Figure 1 is a plan of the invention.

In the drawings is shown a plan view of part of a standard tractor 1 to which the invention is attached. The power take-off of the tractor 1 is provided with a pulley 2 which is connected to the drive pulley 3 of the offset tiller by a pair of belts 4.

The pulley 3 drives by means of a shaft the rotating part of the clutch 5 which under the proper position of the clutch bar 6, connects with the universal coupling 9. To this coupling is attached a shaft 10 which may or may not be provided with an adjusting part 11, and the said shaft is in turn connected to another coupling 12 which is similar to the coupling 9. The coupling 12 provides rotation to the shaft 19 extending therefrom, and on the said shaft is mounted a pinion 20.

The invention is provided with a tiller arm 21 which extends from the body of the tractor and at right angles to it. The said arm is rectangular in cross-section and is made so that it can slide freely in a rectangular guide 23 which is attached to the tractor by a pivotal connection 25.

Figure 3:
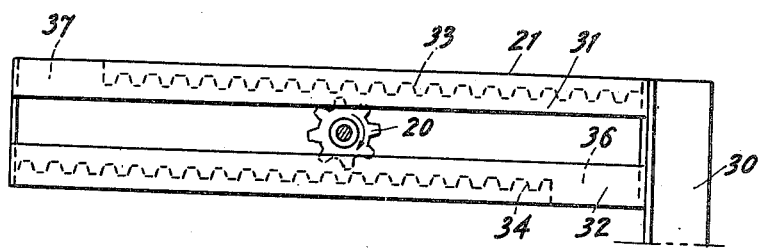
Figure 3 is an elevation of the tiller arm.
Figure 4:
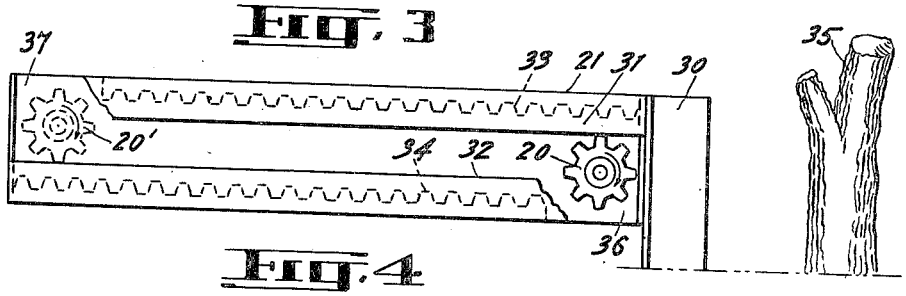
Figure 4 is another elevation of the tiller arm.

The arm 21 as shown in detail in Figures 3 and 4, is provided with an upper rack 33 and an opposite lower rack 34. The pinion 20 is located between the racks 33 and 34. To the outer end of the arm 21 is attached a bracket 30 which services as a means of attachment for the various digging tools used for the purpose of soil cultivation. The bracket shown here is used strictly by way of example and it is not intended to limit the invention to this particular type. In this illustration a duckfoot point is shown attached to the tiller arm. The said point is designated by the numeral 22. To retain the pinion 20 within the tiller arm, the said arm is provided with two opposite guards 31 at the top of the arm, and two lower guards 32. The upper rack 33 terminates at the outer end of the arm 21 but is short of the inner end so that an empty space 37 is provided within the arm 21. The lower rack 34 terminates at the inner end of the arm 21 but falls short of the outer end of the said arm, so that a space 36 is provided within the said arm. The purpose of the spaces 36 and 37 will be indicated further on.

Figure 2:
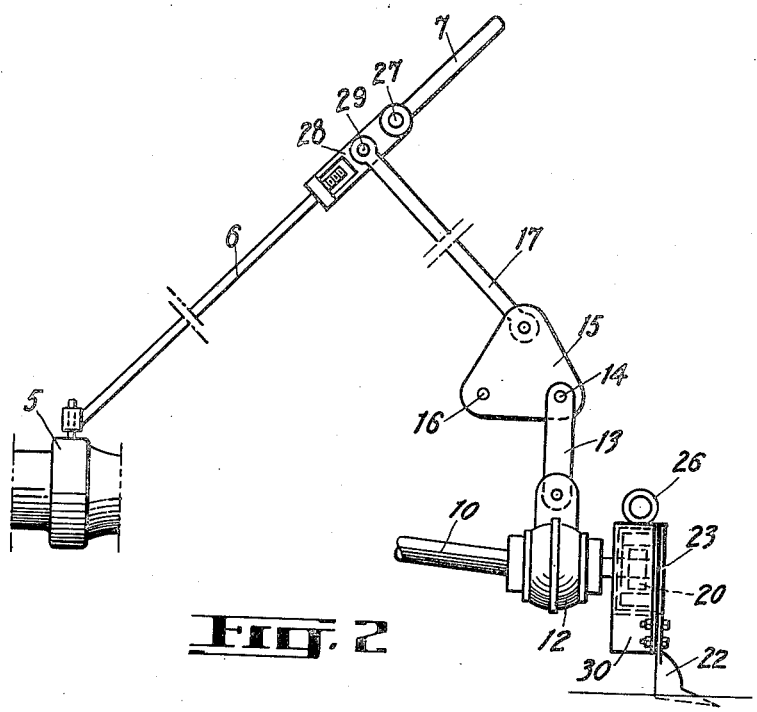
Figure 2 is an elevation of the invention, showing the more essential parts.

In Figure 2 is shown the means by which the offset tiller is operated. The clutch 5 which may be of the two way type is operated by a lever 7 which is an extension of a pivoted bracket 28. The said bracket is rotatably pivoted on a pin 27 which is rigidly attached directly or through another medium to the tractor 1. A clutch bar 6 is the connecting link between the clutch 5 and the bracket 28. At a suitable point on the bracket 28 is a pin 29 on which is pivotally attached an arm 17, the opposite end of which is pivotally attached to a somewhat triangular plate 15. A pin 16 attaches the plate 15 directly or indirectly to the tractor, and the said plate is free to rotate upon the pin 16.

In the third and remaining corner of the plate 15 is another pin 14 upon which rotates the link 13 which is pivotally attached to the coupling 12.

When the lever 7 is pulled upwardly, the clutch 5 is activated and the pinion 20 rotates, in this case shown rotating in a clockwise direction. At the same time, the arm 17 is pushed downwardly thereby lowering the coupling 12 and the pinion 20 which in turn engages the lower rack thus pulling the arm 21 inwardly towards the body of the tractor and away from any tree which may be obstructing the path of the tiller. When the empty space 36 is reached by the said pinion, the arm will of course stop its movement even though the said pinion may still be rotating. The pinion will now occupy the position shown by 20 in Figure 4.

When the position of the lever 7 is reversed from the position indicated above, the pinion 20 will now engage the upper rack 33, thus pulling the tiller arm 21 away from the body of the tractor so that cultivation may resume after the tractor passed the obstacle such as part of a tree as shown at 35.

The distance of the digging point on the tiller arm away from the body of the tractor may be easily adjusted by throwing the pinion 20 into a neutral position at any point on the said tiller arm as shown in Figure 3. When either end of the tiller arm 21 is reached by the pinion 20, the said pinion will not engage the upper or lower racks because of the clearances 37 and 36, respectively.

Before the arm 21 may be moved back and forth by means of the shifting of the lever 7, it must in each case be raised so that the point 22 does not engage the ground. For this purpose, a ring 26 is provided in the guide 23, to which a rope or cable can be attached for the purpose of raising or lowering of the arm 21. The raising or lowering of the said arm may be accomplished by means of a plurality of pulleys which lead the rope to within reach of the tractor operator, or the said rope or cable may be attached through a series of pulleys to the hydraulic lifting arm of the type of tractor in which such hydraulic arms are provided.

As previously stated, the bracket 30 as shown in the drawings serves strictly as an illustration. It may be changed in shape and structure in order to accommodate various types of points, shovels, ploughs, disks, or grape hoes, as the case may require.

Several connecting bars such as 8, 16, 18, and 24 are shown, by means of which the tiller may be attached to the tractor. Various other means and combinations may be employed by those skillful in the art without deviating from the scope of this invention.

From the above description it is obvious that the operation of the offset tiller is comparatively simple. The tiller is brought in a position for cultivation of the soil regardless as to whether there are any obstruction or not. In the case where such obstructions are present in the form of trees or vines, the tiller is brought into position by the tractor to which the said tiller is attached. The position of the pinion 20 is such that it can engage the lower rack. The tractor is driven forward and the soil is dug until an obstacle is met, the arm is then lifted to disengage the point 22 from the ground, the lever 7 is thrown in a position to engage the lower rack, the arm 21 is pulled away from the obstacle, and the tractor is driven forward enough to clear the said obstacle. When the obstacle is cleared, the lever 7 is moved in a position to engage the upper rack, the arm moves forward to its original position, and the cultivation is resumed. The process is repeated as often as required.

I claim:

A tiller attachment for a tractor which is provided with a power take-off comprising a clutch connected to the said power take-off of the tractor by means of pulleys and belts, in combination with a universal coupling attached to the said clutch, a shaft attached to the said universal coupling at one end thereof, and the other end of said shaft being attached to a second universal coupling from which extends a comparatively short shaft bearing a pinion, a tiller arm at rightangles to said shaft engaging said pinion for reciprocatory purposes when said tiller attachment is either at rest or in motion, a guide bracket which freely supports and guides said tiller arm, said bracket being pivotally attached to the tractor, means for attaching standard cultivating tools to the tiller arm, a combined control for said clutch and pinion comprising a clutch lever attached to a pivoted bracket, a clutch rod connecting said bracket with the clutch, a rod pivotally connected to said clutch bracket, the opposite end of which is pivotally connected to an intermediate plate, an intermediate plate as mentioned above which is pivoted on a pin rigidly attached to the tractor and rotatably connected by means of a link to the secondly-named universal coupling, and said intermediate plate and its related pivots so arranged that the throwing of the clutch into rotation in any direction automatically engages the said pinion with the said tiller arm to cause said tiller arm to travel either to or away from the said tractor.

CHARLES CLIFFORD DE WITT.

REFERENCES CITED

The following references are of record in the file of this patent:

UNITED STATES PATENTS

| Number | Name | Date |
|---|---|---|
| 25,465 | Broughton | Sept. 13, 1859 |
| 520,828 | Miehle | June 5, 1895 |
| 549,261 | Sheldon | Nov. 5, 1895 |
| 1,008,837 | Luke et al. | Nov. 14, 1911 |
| 1,206,200 | Bontrager | Nov. 28, 1916 |
| 1,728,313 | Wilson | Sept. 17, 1929 |
| 1,744,479 | Lindgren et al. | Jan. 21, 1930 |
| 2,279,652 | Beard | Apr. 14, 1942 |
| 2,442,731 | Paul | June 1, 1948 |